(12) United States Patent
Krishnan et al.

(10) Patent No.: US 11,132,344 B2
(45) Date of Patent: Sep. 28, 2021

(54) CORRELATING AND REFERENCING BLOCKCHAINS

(71) Applicant: Boardwalktech, Inc., Cupertino, CA (US)

(72) Inventors: Ganesh Krishnan, Cupertino, CA (US); Dharmesh Kirit Dadbhawala, San Jose, CA (US); Ashish Baluja, Sunnyvale, CA (US); Bhaumik Dedhia, San Jose, CA (US)

(73) Assignee: Boardwalktech, Inc., Cupertino, CA (US)

( * ) Notice: Subject to any disclaimer, the term of this patent is extended or adjusted under 35 U.S.C. 154(b) by 265 days.

(21) Appl. No.: 16/354,817

(22) Filed: Mar. 15, 2019

(65) Prior Publication Data

US 2020/0293504 A1 Sep. 17, 2020

(51) Int. Cl.
*G06F 16/22* (2019.01)
(52) U.S. Cl.
CPC ................. *G06F 16/2228* (2019.01)
(58) Field of Classification Search
CPC .............. G06F 16/2228; G06F 16/22
USPC ....................................................... 707/743
See application file for complete search history.

(56) References Cited

U.S. PATENT DOCUMENTS 10,877,930 B2 * 12/2020 Lu ................... G06F 16/1837
10,878,052 B2 * 12/2020 Lu ........................ H04L 9/0637
2019/0266145 A1 * 8/2019 Qiu ..................... G06F 16/2365
2020/0034395 A1 * 1/2020 Lu ......................... H04L 9/0643
2020/0175003 A1 * 6/2020 Jiang .................. G06F 16/2365

OTHER PUBLICATIONS

H. Jin, X. Dai and J. Xiao, "Towards a Novel Architecture for Enabling Interoperability amongst Multiple Blockchains," 2018 IEEE 38th International Conference on Distributed Computing Systems (ICDCS), Vienna, 2018, pp. 1203-1211, doi: 10.1109/ICDCS.2018.00120. (Year: 2018).*

(Continued)

*Primary Examiner* — Michael Pham
(74) *Attorney, Agent, or Firm* — Georgiy L. Khayet

(57) ABSTRACT

Systems and methods for correlating and referencing blockchains are described herein. An example method may include providing a database configured to store at least one grid. The grid comprises positions referenced by coordinates. The method may include acquiring, by a processor communicatively coupled to the database, a plurality of blockchains. The method may further include mapping, by the processor, the blockchains to the positions within the grid. The method may include acquiring, by the processor, a subset of coordinates ({P}) corresponding to a subset of the positions within the grid and a set of specifications ({S}). The specifications include an instruction for selection of blocks of one or blockchains mapped to on or more position of the subset of the positions. The method may include associating a function F({P}, {S}) with a further position within the grid, wherein the function F ({P}, {S}) operates on contents of the selected blocks.

20 Claims, 9 Drawing Sheets

(56) References Cited

OTHER PUBLICATIONS

L. Kan, Y. Wei, A. Hafiz Muhammad, W. Siyuan, L. C. Gao and H. Kai, "A Multiple Blockchains Architecture on Inter-Blockchain Communication," 2018 IEEE International Conference on Software Quality, Reliability and Security Companion (QRS-C), Lisbon, 2018, pp. 139-145, doi: 10.1109/QRS-C.2018.00037. (Year: 2018).*
Deng et. al. "Research on Cross-Chain Technology based on Sidechain and Hash-Locking". Jun. 16, 2018. Edge 2018: Edge Computing—Edge 2018. pp. 144-151. (https://link.springer.com/chapter/10.1007/978-3-319-94340-4_12 access date Jan. 30, 2021, printed pp. 1-11) (Year: 2018).*
Yang et. al. "CVEM: A Cross-Chain Value Exchange Mechanism" 2018 Association for Computing Machinery. CCIOT 2018, Oct. 29-31, 2018, Singapore, Singapore. pp. 80-85. (Year: 2018).*
Vitalik Buterin. "chain Interoperability". Sep. 9, 2016. R3 Reports. pp. 1-17. (Year: 2016).*

\* cited by examiner

CORRELATING AND REFERENCING BLOCKCHAINS

TECHNICAL FIELD

The present disclosure relates generally to data processing and, more particularly, to system and method for correlating and referencing blockchains.

BACKGROUND

Blockchain technology are now widely used to track financial transactions. The blockchain technology can be also utilized to track information in other fields, such as outcomes of medical procedures, official registration records, storehouse records, and so forth. As the blockchain technology continues to develop, there is a need to collect and utilize information from different blockchains.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer-implemented systems and methods for correlating and referencing blockchains. Some embodiments of the present disclosure provide systems and methods for referencing a set of blocks from one of the plurality of blockchains in other blockchains of the plurality of blockchains.

According to one example embodiments, a system for correlating and referencing blockchains may include a database configured to store at least one grid. The grid may include positions referenced by coordinates. The system may further include a processor communicatively coupled to the database. The processor can be configured to acquire a plurality of blockchains. The processor may further map the blockchains to the positions within the grid. The processor may further acquire a subset of coordinates ($\{P\}$) corresponding to a subset of the positions within the at least one grid and a set of specifications ($\{S\}$). The specifications $\{S\}$ may include one or more instructions for selection of one or more blocks of one or more blockchains of the plurality of blockchains to obtain selected blocks, wherein the one or more blockchains are mapped to one or more positions of the subset of the positions. The processor may further associate a function $F(\{P\}, \{S\})$ with a further position within the grid, wherein the further position is outside the subset of the positions. The function $F(\{P\}, \{S\})$ operates on contents of the selected blocks.

The blockchains can be associated with blockchain addresses. The blockchain addresses can be immutable. The mapping of the blockchains to the positions may include mapping blockchain addresses to the positions within the grid. The coordinates of the positions within the grid can be mutable. The coordinates $\{P\}$ can be relative coordinates with respect to coordinates of the further position. The further position can be mapped to a further blockchain of the plurality of blockchains.

The instructions for selection may include selecting a first block of one or more blockchains or selecting a last block of one or more blockchains. The instructions for selection may also include selecting all blocks of one or more blockchains starting with a block having a specified blockchain address and/or a specified block number.

The processor can be further configured to generate a grid blockchain. The grid blockchain may include one or more further blocks. The content of the further blocks may include versions of the grid. Each version of the grid can differ from a previous version of the grid by a change caused due to the mapping of a new blockchain to a new position in the grid or assigning a new function $F(\{P\},\{S\}\}$ to the new position in the grid.

According to another embodiment, a method for correlating and referencing blockchains may include providing a database configured to store at least one grid. The grid may include positions referenced by coordinates. The method may include acquiring, by a processor communicatively coupled to the database, a plurality of blockchains. The method may also include mapping, by the processor, the blockchains to the positions within the grid. The method may further include acquiring, by the processor, a subset of coordinates ($\{P\}$) corresponding to a subset of the positions within the grid and a set of specifications ($\{S\}$). The specifications $\{S\}$ may include one or more instructions for selection of one or more blocks of one or more blockchains of the plurality of blockchains to obtain selected blocks, wherein the one or more blockchains are mapped to one or more positions of the subset of the positions. The method may further include associating, by the processor, a function $F(\{P\}, \{S\})$ with a further position within the grid, wherein the further position is located outside the subset of the positions. The function $F(\{P\}, \{S\})$ operates on contents of the selected blocks.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure provides methods and systems for correlating and referencing blockchains of a plurality of blockchains. Embodiments of the present disclosure may allow to reference a set of blocks from a first blockchain of the plurality of blockchains in a second blockchain of the plurality of blockchains. The references to the set of blocks can be used to build functions that operate on the content of blocks in the set of blocks. For example, the references to the set of blocks of blockchains can be used in smart contracts to verify a financial agreement or to perform credible transactions.

Some embodiments of the present disclosure may provide a system for placing the blockchains positionally with respect to each other in a grid. Each blockchain can be assigned a position in the grid, wherein the position is referenced with coordinates. The coordinates of the positions of the blockchains in the grid can be used to refer to the blockchains, locate a first blockchain with respect to a second blockchain, and specify a selection of one or more blocks from a blockchain. The selection can be used to construct a specification for a function operating on contents of selected blocks of the blockchain.

Placement of blockchains in the grid may also allow to aggregate and disaggregate content across a set of blockchains, perform analytics across content of a set of blockchains, perform what-if analysis across a set of blockchains, obtain values of content of different blockchains, and track parallel evolution of blockchains.

Technical effects of certain embodiments of the present disclosure may include reducing or avoiding copying and duplication of data when blockchains are evolved since specification language of functions allows operating on references to the blockchains. Once the blockchains are evolved, the specification language of the functions does not need to be changed. Embodiments of the present disclosure may allow referencing a block of a blockchain directly instead of extracting the content of the block. Embodiments of the present disclosure may provide a method of linking to blockchain addresses and embedding data of blockchains.

Figure 1:
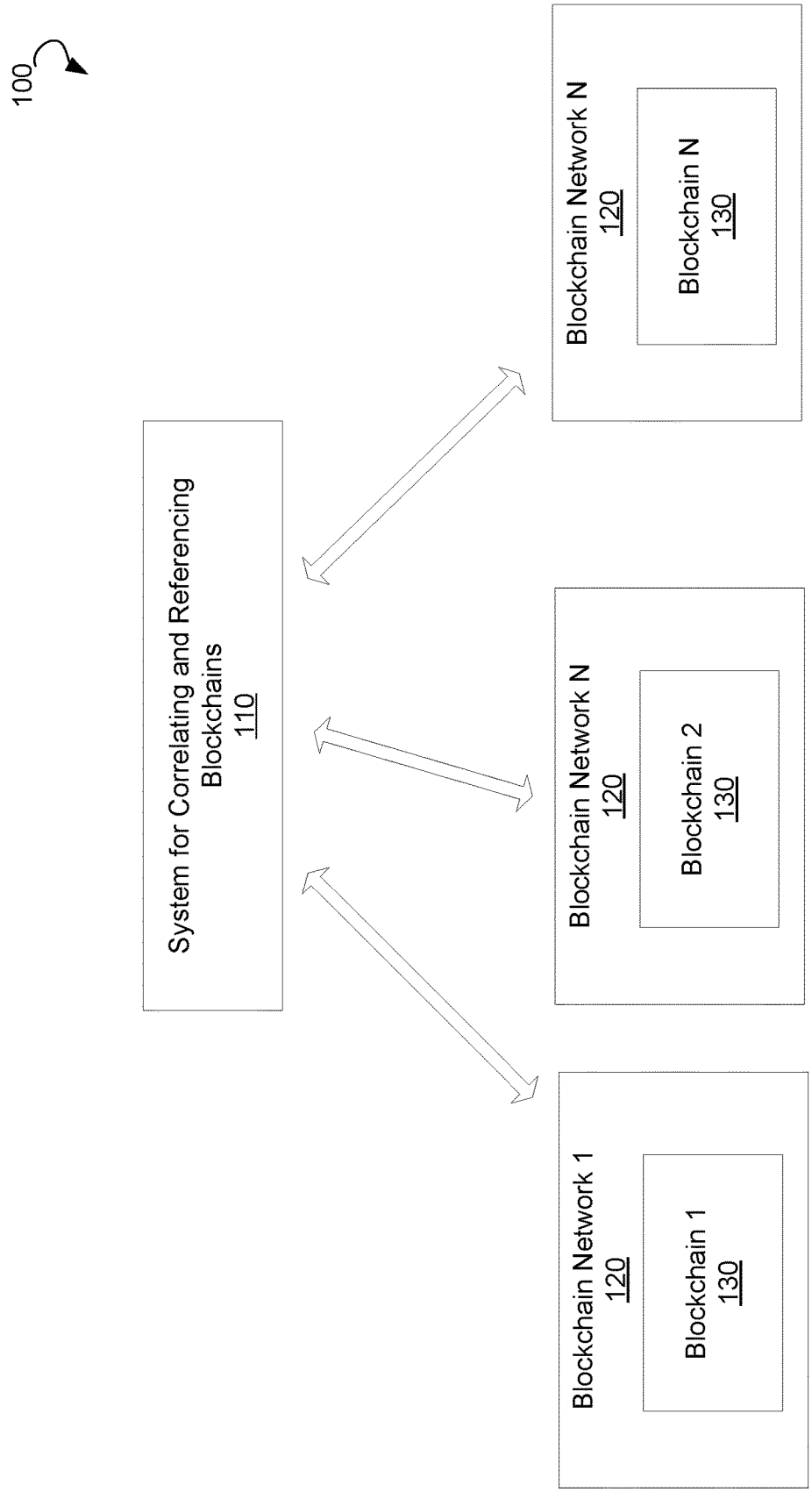
FIG. 1 is a block diagram showing an example environment, wherein a method for correlating and referencing blockchains can be implemented.

FIG. 1 is a block diagram showing an example environment 100, wherein a method for correlating and referencing blockchains can be implemented. The example environment 100 can include a system for correlating and referencing blockchains 110 and one or more blockchain networks 120. The system 110 may include a computing system as described in FIG. 2 or FIG. 8. For example, the system 110 may include a personal computer (PC), a laptop, a smartphone, a tablet PC, a television set, a smartphone, an Internet phone, a netbook, a network appliance, a server, or a computing cloud shared by multiple users, and so forth.

The blockchain networks 120 may include a network of computing systems. The blockchain networks 120 can be configured to generate one or more blockchains 130. Each of the blockchains 130 may include blocks. Each block may keep a portion of information for which the blockchain is configured in order to track changes. For example, blocks of a blockchain may store financial transactions. Blocks of another blockchain may store purchase transaction. Blocks of yet another blockchain may store prices of products and components. Once completed, a block of a blockchain can be kept in the blockchain permanently. New blocks can be generated as needed. The number of the blocks in a blockchain is unlimited. The blocks in the blockchain can be connected to each other in a chronological order. Each block can contain a hash of the previous block. The blocks of the blockchain can be assigned blockchain addresses. The blockchain addresses and content of the blocks can be immutable and cannot be deleted or modified once blocks are completed.

The system 110 may be connected to the blockchain networks 120 via a data network. The data network may include a computing cloud, the Internet, or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

Figure 2:
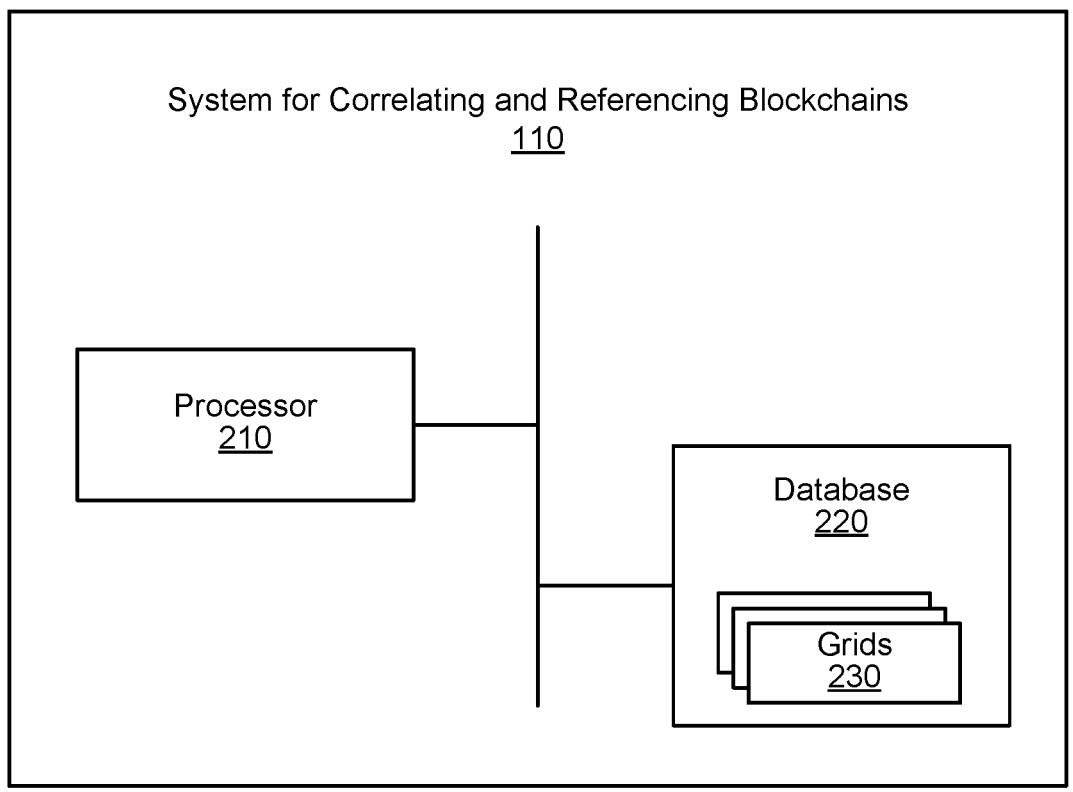
FIG. 2 is a block diagram showing an example system for correlating and referencing blockchains, according to some example embodiments.

FIG. 2 is a block diagram showing an example system 110 for correlating and referencing blockchains, according to some example embodiments. The example system 110 may include a processor 210 in communication with a database 220. The database 220 may be configured to store one or more grids 230. The grids 230 may include one or more positions referenced by coordinates. The processor 210 may be configured to acquire one or more blockchains 130. The processor 210 may further map the blockchains 130 to positions within one or more grids 230. The processor 210 may further be configured to provide access to the contents of the blockchain 130 via coordinates of the positions within the grids 230, to which the blockchains 130 are mapped.

Figure 3:
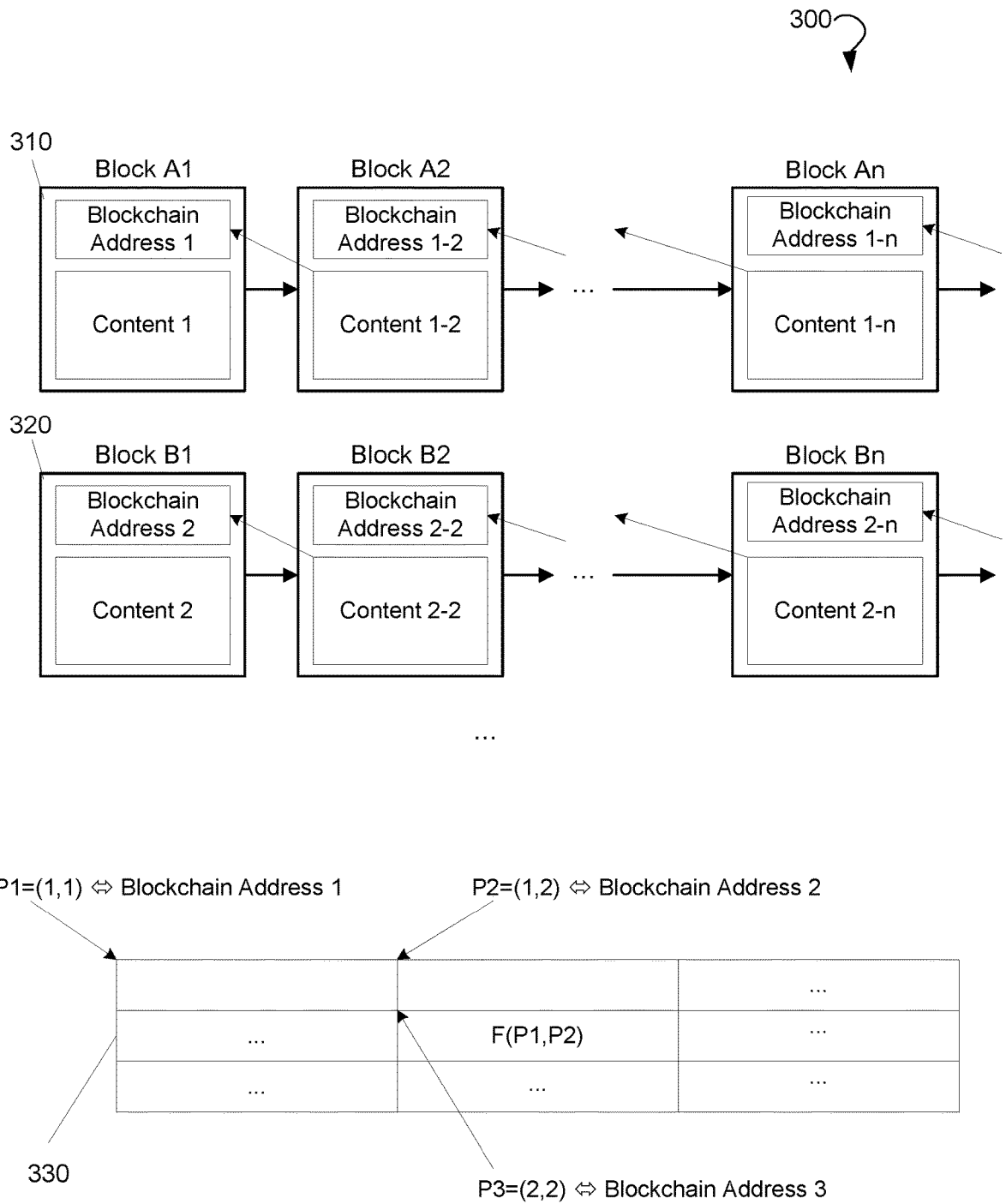
FIG. 3 is a block diagram showing a scheme for referencing blockchains using a grid, according to an example embodiment.

FIG. 3 is a block diagram showing an example scheme 300 for referencing blockchains using a grid, according to an example embodiment. The example scheme 300 includes a first blockchain 310, a second blockchain 320, and a grid 330. The first blockchain 310 may include block A1, block A2, . . . , block An, and so forth. Each block may have a blockchain address and content. The blockchain 310 can be associated with an immutable address (Blockchain Address 1) when the first block A1 is generated. The Blockchain Address 1 can be valid across the whole blockchain 310 as the chain of the blocks A1, A2, . . . , An, . . . evolves. Similarly, the second blockchain 320 may include block B1, block B2, . . . , block Bn, and so forth, wherein the first block B1 has address Blockchain Address 2 valid across the whole blockchain 320.

The blocks of the blockchains 310 and 320 may store correlated data. For example, the blocks of the blockchain 310 may include information concerning purchase orders of components, and the blocks of the blockchain 320 may include information concerning prices of the components. In another example, the blocks of the blockchain 310 may include information on outcomes of medical procedures and the blocks of the blockchain 320 may include information on hospital expenses for the medical procedures.

The grid 330 may include positions P1, P2, P3, and so forth. The positions can be referenced to each other by coordinates (1,1), (1,2), (2,2), and so forth. The blockchains 310 and 320 can be mapped, by the processor 210, to the positions within the grid 330. For example, the blockchain 310 can be mapped to position P1 and the blockchain 320 can be mapped to position P2. Since the block addresses in blockchains 310 and 320 are immutable, mapping the blockchain 310 can be carried out by mapping blockchain address of a first block A1 of the blockchain 310 (Blockchain Address 1) to the position P1. Similarly, mapping the blockchain 320 can be carried out by mapping blockchain address of a first block B1 of the blockchain 320 (Blockchain Address 2) to the position P2.

Once the blockchains 310 and 320 are mapped to the positions within the grid 330, the contents and addressed of the blockchains can be accessed using the coordinates of the positions. In example of FIG. 3, a function F(P1,P2) can be written to the position P3 of the grid. The function F(P1,P2) can be configured to operate on content of a blockchain mapped to the position P1 (which is blockchain 310) and content of a blockchain mapped to the position P2 (which is blockchain 320). For example, function F(P1,P2)=F(P1)+F(P2) may imply that content of blocks of the blockchain at position P1 (blockchain 310) needs to be added to contents of blocks of the blockchain at position P2 (blockchain 320). The result of the function F(P1,P2) can be a third blockchain, wherein the blocks represent sums of the blocks of the blockchain 310 and the blockchain 320. The third blockchain may start with a block having Blockchain Address 3. The third blockchain can be mapped to the position P3.

The positions of blockchains in the grid 330 can be specified by coordinates relative to a selected position. For example, the coordinate of position P2 can be referred to as P1+1, which is the next position to the position P1 in the grid. According to another example, P2 can be specified by an offset (0,1) from P1.

Figure 4:
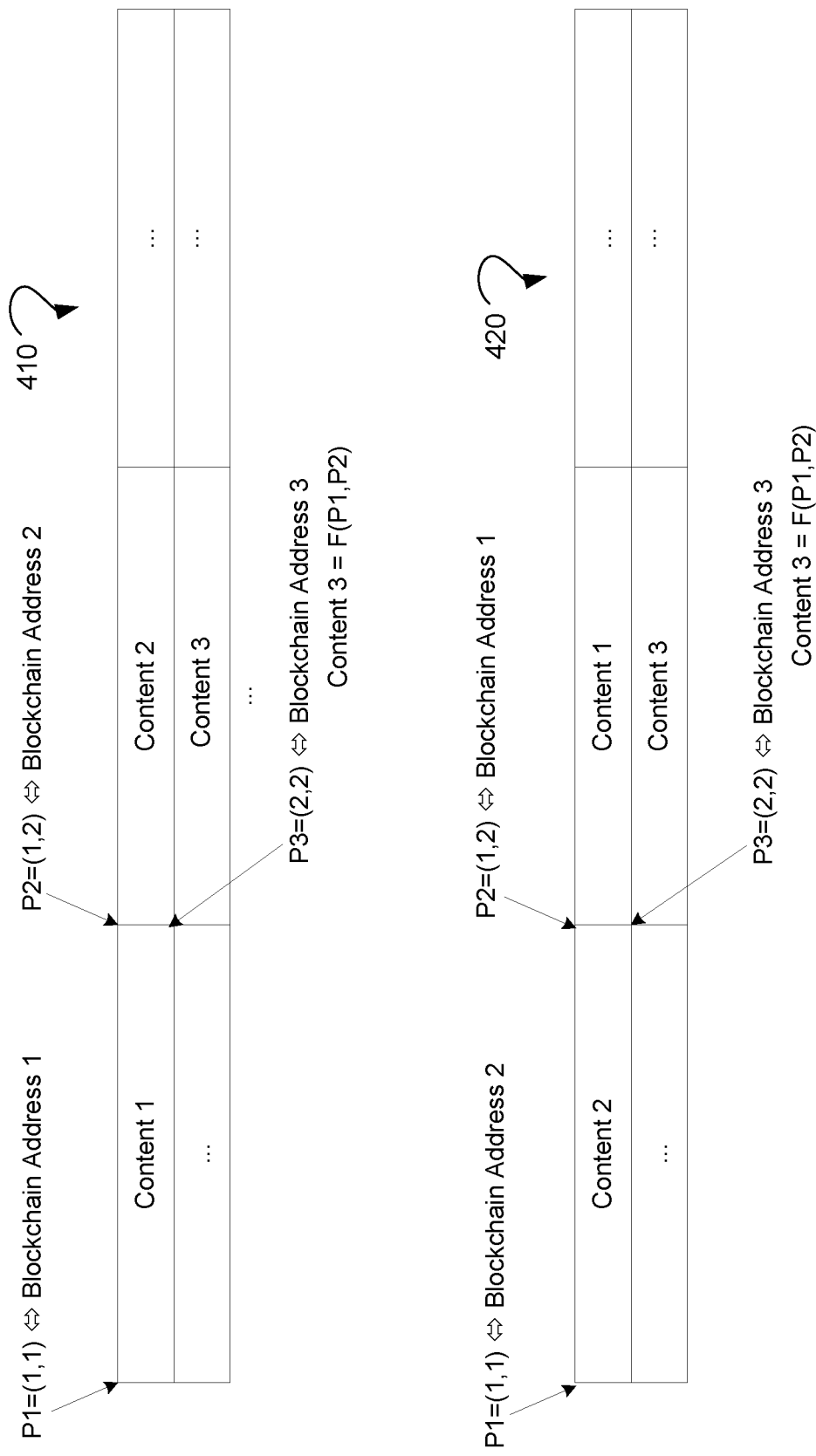
FIG. 4 is a block diagram showing grids for referencing blockchains, according to an example embodiment.

FIG. 4 is a block diagram showing grids 410 and 420 for referencing the same plurality of blockchains, according to an example embodiment. As shown in FIG. 4, at the same time blockchain 310 and 320 can be mapped to at least two different grids 410 and 420 in the database 220. In the grid 410, the blockchain 310 is mapped to the position P1 and the blockchain 320 is mapped to the position P2. In the grid 420, the blockchain 310 is mapped to the position P2 and the blockchain 320 is mapped to the position P1.

While the blockchain addresses of the blocks in the blockchains are immutable, the positions of the blockchain addresses in a grid, and thus positions of the blockchains in the grid, can be mutable. For example, the positions of the blockchain addresses in a grid, and thus positions of the blockchains in the grid, can be shifted when a new blockchain address is mapped to a position in the grid.

Figure 5:
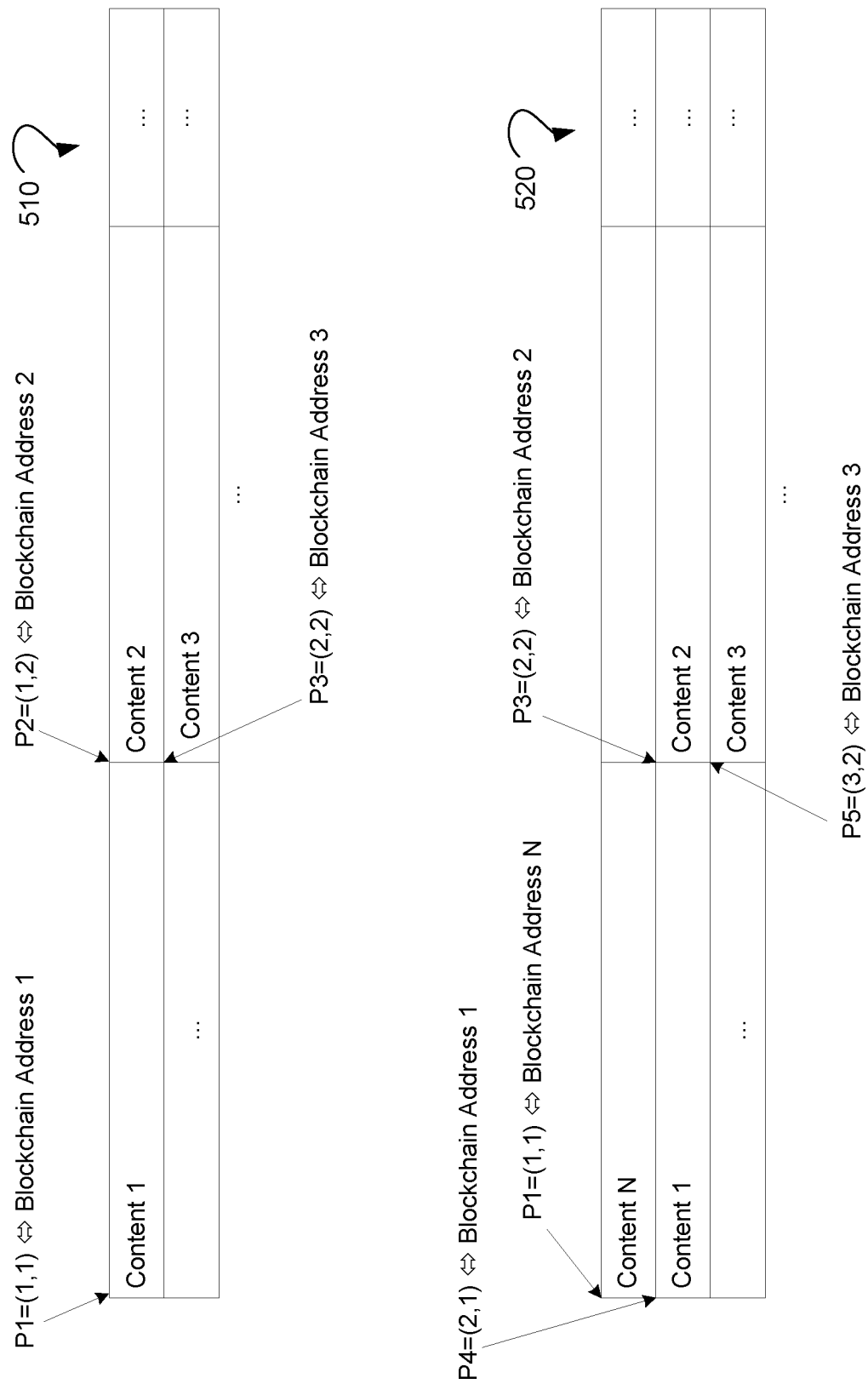
FIG. 5 is a block diagram showing grids for referencing blockchains, according to another example embodiment.

FIG. 5 is a block diagram showing grids 510 and 520 for referencing blockchains, according to an example embodiment. In the grid 510, the Blockchain Address 1 is mapped to the position P1=(1,1), the Blockchain Address 2 is mapped to the position P2=(1,2), and the Blockchain Address 3 is mapped to the position P3=(2,2). In the grid 520, a new Blockchain Address N is mapped to the position P1=(1,1). The positions of Blockchain Address 1, Blockchain Address 2, and Blockchain Address 3 are shifted to the positions P4=(2,1), P3=(2,2), and P5=(3,2). Thus, while blockchain addresses are immutable, the positions corresponding to the blockchain addresses in the grid and the coordinates of the positions can be mutable.

Figure 6:
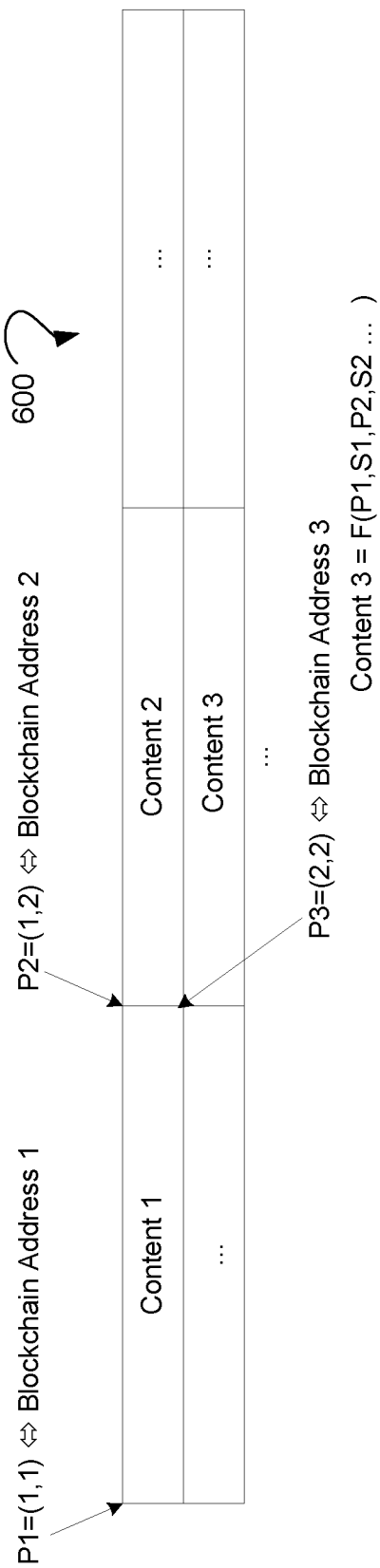
FIG. 6 is a block diagram showing a grid for referencing blockchains, according to an example embodiment.

FIG. 6 is a block diagram showing a grid 600 for referencing blockchains, according to an example embodiment. In the grid 600, the blockchain 310 with Blockchain Address 1 is mapped to a position P1 and the blockchain 320 with Blockchain Address 2 is mapped to a position P2. The coordinates of the positions P1 and P2 within the grid 600 can be used to reference content of the blockchains 310 and 320. For example, a position P3 may be associated with a function F(P1,S1,P2,S2, . . . ), wherein P1 and P2 specifies the coordinates of the position P1 and P2 and S1 and S2 are specifications. The specification S1 may include instructions for selection of blocks of the blockchain mapped to the position P1 (blockchain 310) and the specification S2 may include instruction for selection of blocks of the blockchain mapped to the position P2 (blockchain 320). After the blocks are selected, the function F may operate on content, blockchain addresses, and/or numbers of the selected blocks of the blockchains.

According to various embodiments of the present disclosure, the processor 210 may be configured to evaluate the following functions:

1. F1(Block)=BlockchainAddress. The function F1 returns an address of a specific block.
2. F2(BlockchainAddress)=<Block Chain>. The function F2 returns an entire chain of blocks starting with a BlockchainAddress.
3. F3(BlockchainAddress, S)=one or more Blocks of the blockchain. F3 is a selector function, wherein the parameter S is a specification language (a specification) that allows selection of one or more blocks specified by an address or a number of blocks in blockchain, wherein the first block has address BlockchainAddress.

The function may operate on the grid 600 using positional coordinates of positions P1, P2, P3, and so forth. The coordinate of position can be specified as offsets from a selected position within the grid 600.

In general, a mathematical functions F({P},{S}) may operate on the content of the blocks of blockchains mapped to a set of positions {P} in the grid, wherein the blocks are selected based on a set of specifications {S}. It should be noted that function F((P1,S), (P2,S)) can be automatically applied to selected blocks in blockchain 310 and blockchain 320 can be mapped to positions P1 and P2 as new blocks are being added to the blockchains 310 and 320. P1 applies to all selected blocks of the blockchain 310 and P2 applies to all selected blocks of blockchain 320.

Figure 7:
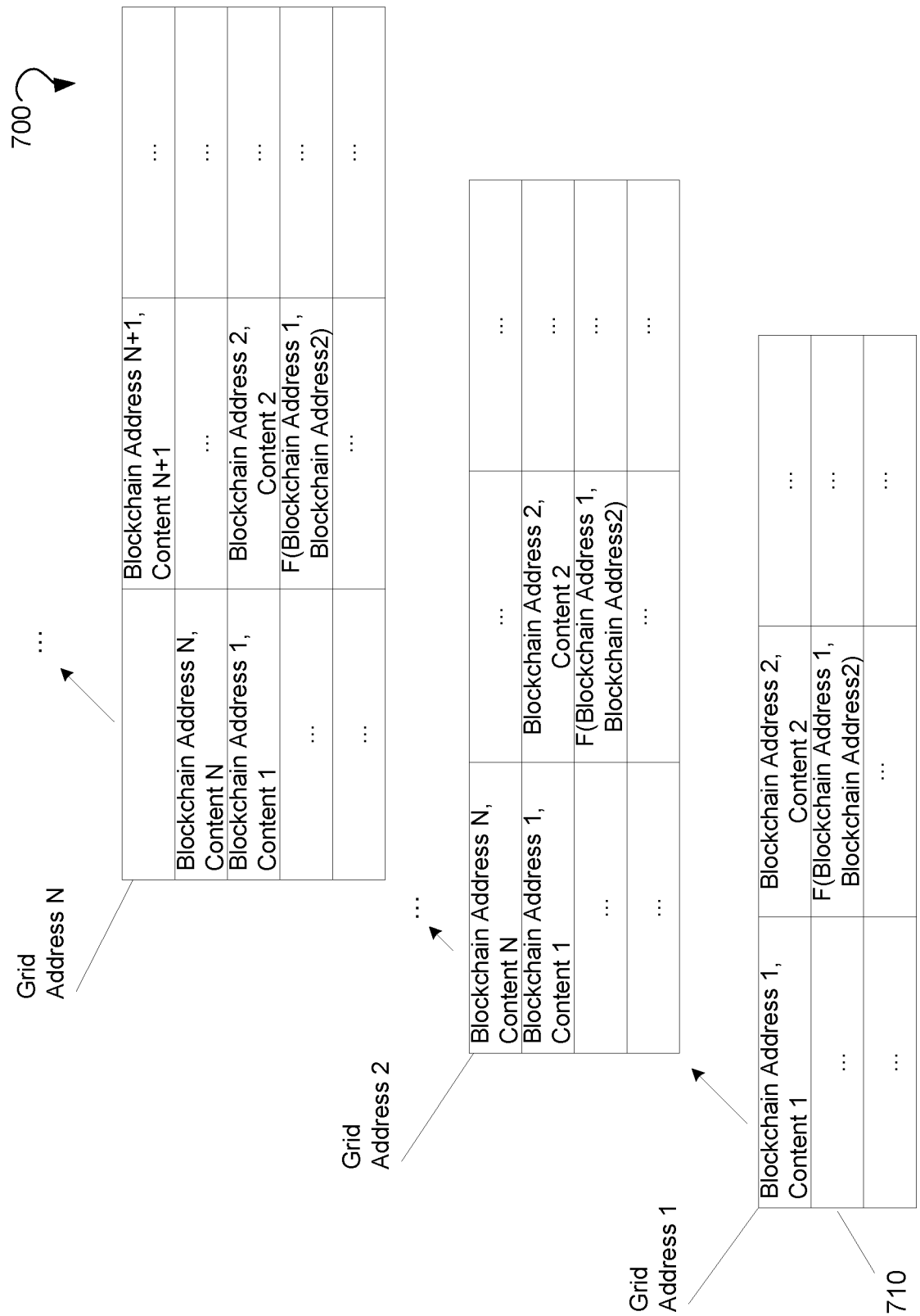
FIG. 7 is a block diagram showing a blockchain of grids for referencing blockchains, according to an example embodiment.

FIG. 7 is a block diagram showing a chain 700 of grids, according to an example embodiment. The chain 700 shows an example evolution of a grid 710 as a change of structure of the grid 710 occurs. The change to the structure of the grid 710 may include, for example, moving positions of blockchain addresses within the grid 710 or adding a new function to a new position in the grid 710, wherein the new function operates on content one or more blockchains positioned within the grid 710. The processor 210 can be configured to store chronological versions of the grid 710 in a form of a grid blockchain. Content or payloads of blocks of the grid blockchain may include structures of grid 710 after each change to the structure. Each block of the grid blockchain can be assigned a grid address (Grid Address 1, Grid Address 2, . . . ). Once generated, the blocks and grid addresses of the grid blockchain can be kept immutable in the database 220.

Figure 8:
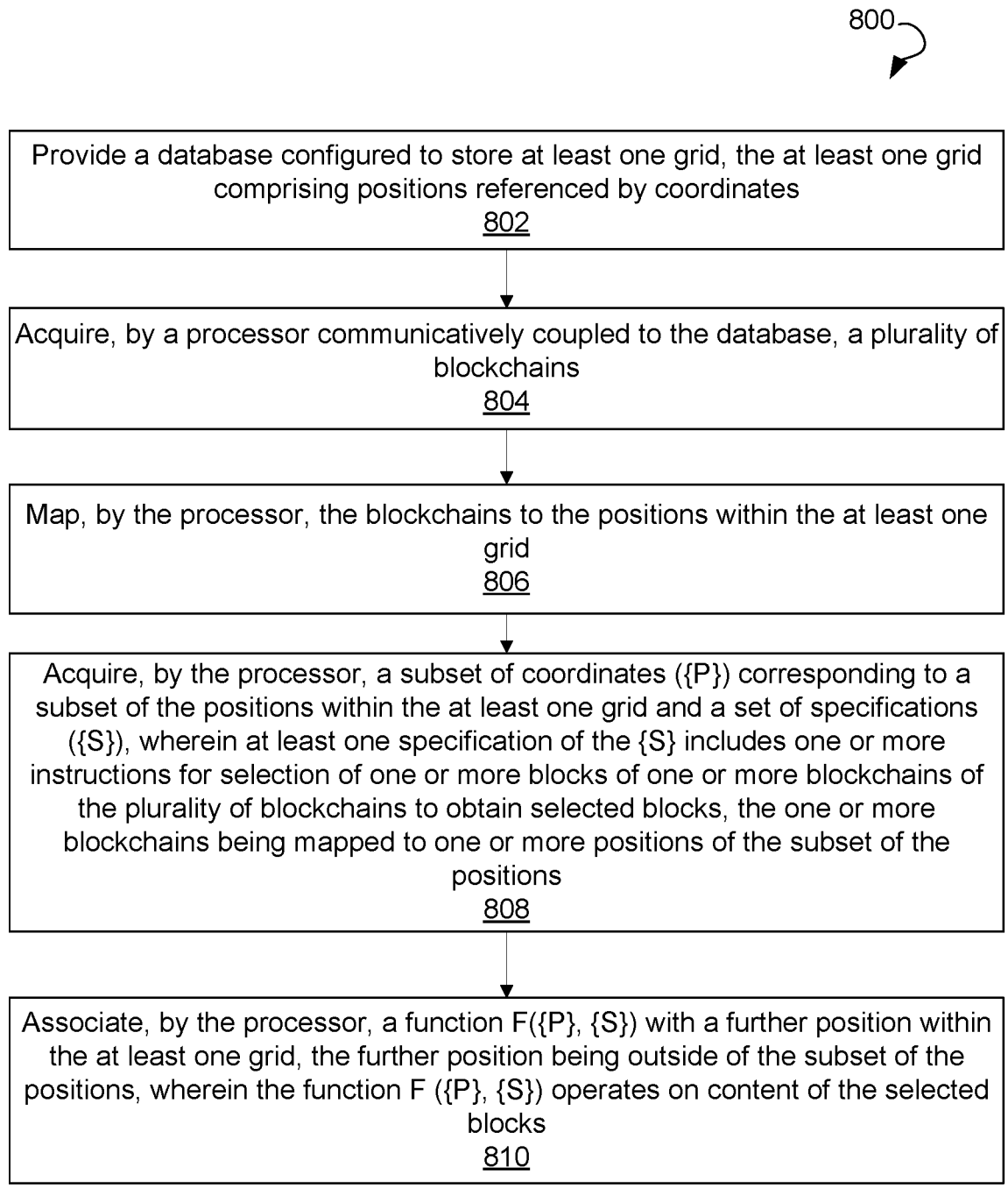
FIG. 8 is a flow chart showing an example method for correlating and referencing blockchains, according to an example embodiment.

FIG. 8 is a flow chart showing an example method for correlating and referencing blockchains, according to an example embodiment. In some embodiments, the operations may be combined, performed in parallel, or performed in a different order. The method 800 may also include additional or fewer operations than those illustrated. The method 800 may be performed by processing logic that may comprise hardware (e.g., decision making logic, dedicated logic, programmable logic, and microcode), software (such as software run on a general-purpose computer system or a dedicated machine), or a combination of both.

The method 800 may commence in block 802 with providing a database configured to store at least one grid. The grid may include positions. The positions can be referenced by coordinates. In block 804, the method 800 may proceed with acquiring, by a processor communicatively coupled to the database, a plurality of blockchains. Each of the blockchains may include immutable blocks associated with immutable blockchain addresses. In block 806, the method 800 may map, by the processor, the blockchains to the positions within the grid. The mapping of a blockchains to a position may include mapping the blockchain address of the blockchain to the position. The position of the blockchain within the grid can be mutable.

In block 808, the method 800 may include acquiring, by the processor, a subset of coordinates ({P}) corresponding to a subset of the positions within the grid and a set of specifications ({S}). At least one specification of the {S} may include one or more instructions for selection of one or more blocks of one or more blockchains of the plurality of blockchains to obtain selected blocks, wherein the one or more blockchains are mapped to one or more positions of the subset of the positions In block 810, the method 800 may include associating, by the processor, a function F({P}, {S}) with a further position within the grid. The further position is outside the subset of the positions. The function F ({P}, {S}) operates on contents of the selected blocks.

Figure 9:
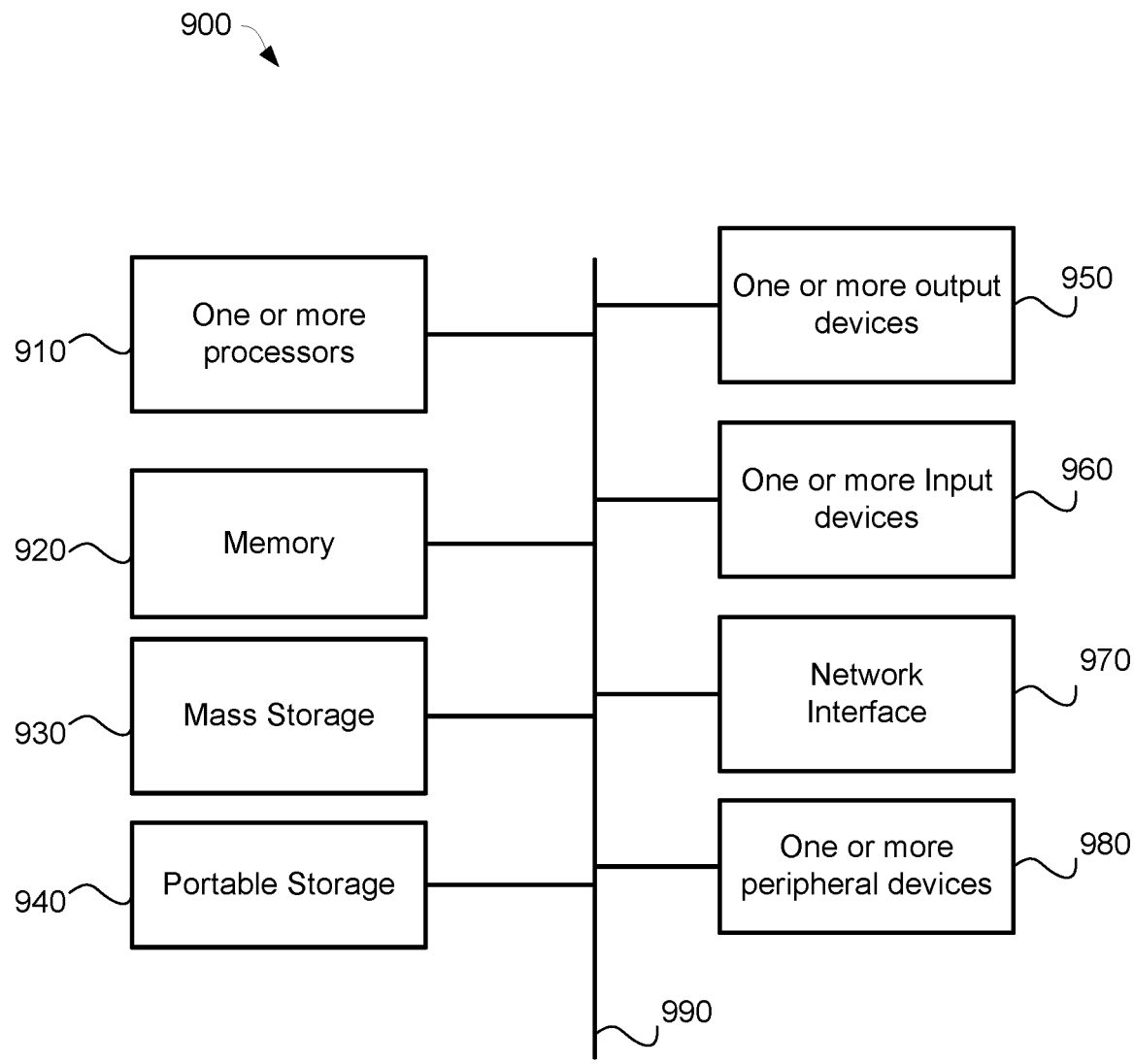
FIG. 9 shows a computing system that can be used to implement a method for correlating and referencing blockchain, according to an example embodiment.

FIG. 9 illustrates an example computing system 900 that may be used to implement embodiments described herein. The example computing system 900 of FIG. 9 may include one or more processors 910 and memory 920. Memory 920 may store, in part, instructions and data for execution by the one or more processors 910. Memory 920 can store the executable code when the exemplary computing system 900 is in operation. The example computing system 900 of FIG. 9 may further include a mass storage 930, portable storage 940, one or more output devices 950, one or more input devices 960, a network interface 970, and one or more peripheral devices 980.

The components shown in FIG. 9 are depicted as being connected via a single bus 990. The components may be connected through one or more data transport means. The one or more processors 910 and memory 920 may be connected via a local microprocessor bus, and the mass storage 930, one or more peripheral devices 980, portable storage 940, and network interface 970 may be connected via one or more input/output buses.

Mass storage 930, which may be implemented with a magnetic disk drive or an optical disk drive, is a non-volatile storage device for storing data and instructions for use by a magnetic disk or an optical disk drive, which in turn may be used by one or more processors 910. Mass storage 930 can store the system software for implementing embodiments described herein for purposes of loading that software into memory 920.

Portable storage 940 may operate in conjunction with a portable non-volatile storage medium, such as a compact disk (CD) or digital video disc (DVD), to input and output data and code to and from the computing system 900 of FIG. 9. The system software for implementing embodiments described herein may be stored on such a portable medium and input to the computing system 900 via the portable storage 940.

One or more input devices 960 provide a portion of a user interface. The one or more input devices 960 may include an alphanumeric keypad, such as a keyboard, for inputting alphanumeric and other information, or a pointing device, such as a mouse, a trackball, a stylus, or cursor direction keys. Additionally, the computing system 900 as shown in FIG. 9 includes one or more output devices 950. Suitable one or more output devices 950 include speakers, printers, network interfaces, and monitors.

Network interface 970 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 970 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 980 may include any type of computer support device to add additional functionality to the computing system. The one or more peripheral devices 980 may include a modem or a router.

The components contained in the exemplary computing system 900 of FIG. 9 are those typically found in computing systems that may be suitable for use with embodiments described herein and are intended to represent a broad category of such computer components that are well known in the art. Thus, the exemplary computing system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, systems and methods for correlating and referencing blockchains are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for correlating and referencing blockchains, the system comprising:
    a database configured to store at least one grid, the at least one grid comprising positions, the positions being referenced by coordinates, wherein upon inserting a new position before an existing position in the at least one grid, coordinates of the existing position are shifted; and
    a processor communicatively coupled to the database, the processor being configured to:
        acquire a plurality of blockchains;
        assign each of the plurality of the blockchains at least one position within the at least one grid;
        acquire:
            a subset of coordinates ($\{P\}$) corresponding to a subset of the positions within the at least one grid; and
            a set of specifications ($\{S\}$), wherein at least one specification of the $\{S\}$ includes one or more instructions for selection of one or more blocks of one or more blockchains of the plurality of blockchains; and
            assign a function $F(\{P\}, \{S\})$ a further position within the at least one grid, the further position being outside the subset of the positions, wherein the function $F(\{P\}, \{S\})$:
                locates, based on the coordinates $\{P\}$, a position C in the at least one grid;
                selects, based on the specification $\{S\}$, one or more blocks of a blockchain B assigned to the position C; and
                operates on content of the selected blocks.

2. The system of claim 1, wherein the blockchains are associated with blockchain addresses, the blockchain addresses being immutable.

3. The system of claim 2, wherein the assigning of each of the plurality of the blockchains the at least one position includes assigning at least one of the blockchain addresses to the at least one position within the at least one grid.

4. The system of claim 1, wherein the coordinates of the positions are mutable.

5. The system of claim 1, wherein the coordinates $\{P\}$ are relative coordinates with respect to coordinates of the further position.

6. The system of claim 1, wherein the further position is mapped to a further blockchain of the plurality of blockchains.

7. The system of claim 1, wherein the one or more instructions for selection include selecting one of: a first block of the one or more blockchains and a last block of the one or more blockchains.

8. The system of claim 1, wherein the one or more instructions for selection include selecting all blocks of the one or more blockchains starting with a block having one of a specified blockchain address or a specified block number.

9. The system of claim 1, wherein the processor is further configured to generate a grid blockchain, the grid blockchain including one or more further blocks, wherein a content of the one or more further blocks includes versions of the at least one grid.

10. The system of claim 9, wherein each of the versions of the at least one grid differs from a previous version of the at least one grid by a change caused due to an assigning of a new blockchain to the new position in the at least one grid or due to an assigning of a new function $F(\{P\},\{S\})$ to the new position in the at least one grid.

11. A method for correlating and referencing blockchains, the method comprising:
    providing a database configured to store at least one grid, the at least one grid comprising positions, the positions being referenced by coordinates, wherein upon inserting a new position before an existing position in the at least one grid, coordinates of the existing position are shifted; and
    acquiring, by a processor communicatively coupled to the database, a plurality of blockchains;

assigning, by the processor, each of the plurality of the blockchains to at least one position within the at least one grid;

acquiring, by the processor:
- a subset of coordinates ({P}) corresponding to a subset of the positions within the at least one grid;
- a set of specifications ({S}), wherein at least one specification of the {S} includes one or more instructions for selection of one or more blocks of one or more blockchains of the plurality of blockchains; and assigning, by the processor, a function F({P}, {S}) a further position within the at least one grid, the further position being outside of the subset of the positions, wherein the function F ({P}, {S})):
- locates, based on the coordinates {P}, a position C in the at least one grid;
- selects, based on the specifications {S}, one or more blocks of a blockchain B assigned to the position C; and
- operates on content of the selected blocks.

12. The method of claim 11, wherein:
the blockchains are associated with blockchain addresses, the blockchain addresses being immutable; and
the assigning of each of the plurality of the blockchains the at least one position includes assigning at least one of the blockchain addresses to the at least one position within the at least one grid.

13. The method of claim 11, wherein the coordinates of the positions are mutable.

14. The method of claim 11, wherein the coordinates {P} are relative coordinates with respect to coordinates of the further position.

15. The method of claim 11, wherein the further position is mapped to a further blockchain of the plurality of blockchains.

16. The method of claim 11, wherein the one or more instructions for selection include selecting one of: a first block of the one or more blockchains and a last block of the one or more blockchains.

17. The method of claim 11, wherein the one or more instructions for selection include selecting all blocks of the one or more blockchains starting with a block having one of a specified blockchain address or a specified block number.

18. The method of claim 11, further comprising generating, by the processor, a grid blockchain, the grid blockchain including one or more further blocks, wherein a content of the one or more further blocks includes versions of the at least one grid.

19. The method of claim 18, wherein each of the versions of the at least one grid differs from a previous version of the at least one grid by a change caused due to an assigning of a new blockchain to the new position in the at least one grid or assigning a new function F({P},{S}} to the new position in the at least one grid.

20. A system for correlating and referencing blockchains, the system comprising:
a database configured to store at least one grid, the at least one grid comprising positions, the positions being referenced by coordinates, the coordinates being mutable, wherein upon inserting a new position before an existing position in the at least one grid, coordinates of the existing position are shifted; and
a processor communicatively coupled to the database, the processor being configured to:
acquire a plurality of blockchains, the blockchains associated with blockchain addresses, the blockchain addresses being immutable;
assign each of the plurality of the blockchains at least one position within the at least one grid, wherein assigning includes assigning at least one of the blockchain addresses to the at least one position;
acquire:
- a subset of coordinates ({P}) corresponding to a subset of the positions within the at least one grid; and
- a set of specifications ({S}), wherein at least one specification of the {S} includes one or more instructions for selection of one or more blocks of one or more blockchains of the plurality of blockchains; and
assign a function F({P}, {S}) a further position within the at least one grid, the further position being outside of the subset of the positions, wherein the function F ({P}, {S}):
locates, based on the coordinates {P}, a position C in the at least one grid;
selects, based on the specifications {S}, one or more blocks of a blockchain B assigned to the position C; and
operates on content of the selected blocks.

* * * * *